(12) United States Patent
Chang et al.

(10) Patent No.: US 8,520,066 B2
(45) Date of Patent: Aug. 27, 2013

(54) AUTOMATED OPTICAL INSPECTION SYSTEM FOR THE RUNOUT TOLERANCE OF CIRCULAR SAW BLADES

(75) Inventors: Wen-Tung Chang, Taipei (TW);
Chin-Hsien Su, Taipei (TW); Dong-Xie Guo, Kaohsiung (TW); Geo-Ry Tang, Taipei (TW); Fang-Jung Shiou, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 361 days.

(21) Appl. No.: 13/052,579

(22) Filed: Mar. 21, 2011

(65) Prior Publication Data
US 2012/0242827 A1    Sep. 27, 2012

(51) Int. Cl.
*H04N 9/47* (2006.01)
*H04N 7/18* (2006.01)

(52) U.S. Cl.
USPC .......................................................... 348/92

(58) Field of Classification Search
USPC .................................................. 348/61–162
See application file for complete search history.

(56) References Cited

U.S. PATENT DOCUMENTS

| | | | |
|---|---|---|---|
| 5,642,159 A * | 6/1997 | Oba | 348/95 |
| 6,105,446 A * | 8/2000 | Rein | 73/865.9 |
| 6,462,811 B1 * | 10/2002 | Turner et al. | 356/237.1 |
| 2003/0202091 A1 * | 10/2003 | Garcia et al. | 348/86 |
| 2011/0042115 A1 * | 2/2011 | Koeder et al. | 173/141 |
| 2012/0048090 A1 * | 3/2012 | Etter et al. | 83/473 |

* cited by examiner

*Primary Examiner* — Sath V Perungavoor
*Assistant Examiner* — Talha Nawaz
(74) *Attorney, Agent, or Firm* — Morris Manning & Martin LLP; Tim Tingkang Xia, Esq.

(57) ABSTRACT

An automated optical inspection system for the runout tolerance of circular saw blades comprises a rotating device, a first and a second optical inspection module, and a computing device. The rotating device is used to rotate a circular saw blade. The circular saw blade includes multiple teeth, and each tooth has a side and a back. The first/second optical inspection module is used to capture a side/back image of the tooth. The computing device activates the rotating device to rotate the circular saw blade, and activates the first and the second optical inspection module to capture the side image and the back image of each tooth upon rotation of the circular saw blade. The computing device performs a radial-position-calculating procedure according to the side images, to obtain an amount of radial runout, and performs an axial-position-calculating procedure according to the back images, to obtain an amount of axial runout.

7 Claims, 17 Drawing Sheets

AUTOMATED OPTICAL INSPECTION SYSTEM FOR THE RUNOUT TOLERANCE OF CIRCULAR SAW BLADES

BACKGROUND OF THE INVENTION

1. Field of Invention

The present invention relates to an inspection system, and more particularly to a non-contact automated optical inspection system suitable for inspecting the runout tolerance of a circular saw blade.

2. Related Art

As the industrial products become increasingly sophisticated, higher demands are raised on the precision of the cutting tools. A circular saw blade is an essential tool for cutting materials, and is widely used in various manufacturing industries. If an amount of radial runout and an amount of axial runout of the circular saw blade are too large, uneven cutting amount and wear degree of each tooth of the circular saw blade are caused, such that the cutting quality and the durability of the circular saw blade are poor. In quality control of the products of a circular saw blade manufacturer, the radial runout tolerance and the axial runout tolerance of the finished products of the circular saw blades must be inspected to ensure that the products of the circular saw blades can achieve desirable cutting quality and durability.

The amount of radial runout is defined as a maximal relative deviation between radial positions of apexes (tips) of the teeth upon rotation of the circular saw blade; and the radial positions are positions of the apexes (tips) of the teeth measured with respect to a reference along a radial direction of the circular saw blade. The radial runout tolerance is generally specified within the range of ±0.03 mm (millimeter) to ±0.06 mm depending on the size of the circular saw blade.

The axial runout tolerance is defined as a maximal relative deviation between axial positions of boundaries of the teeth at the same side upon rotation of the circular saw blade; and the axial positions are positions of boundaries of the teeth measured with respect to a reference along an axial direction of the circular saw blade. The axial runout tolerance is generally specified within the range of ±0.03 mm to ±0.08 mm depending on the size of the circular saw blade.

In a conventional inspection method of the runout tolerance of the circular saw blade, a measuring tool such as a dial indicator is used. During the inspection process, a probe of the dial indicator contacts with the teeth along the radial direction or the axial direction, and then the circular saw blade is rotated. Then, the amount of radial runout or the amount of axial runout of the circular saw blade can be calculated through a relative variation indicated by the dial indicator, and whether the amount of radial runout or the amount of axial runout falls within a specified tolerance range can be evaluated accordingly. However, this method has low efficiency, and may cause surface wear of the probe of the dial indicator due to the contact inspection, thus resulting in the error in inspection.

SUMMARY OF THE INVENTION

To solve the above problems, the present invention is an automated optical inspection system for the runout tolerance of circular saw blades, which is used for inspecting a radial runout tolerance and an axial runout tolerance of a circular saw blade. The circular saw blade includes multiple teeth, and each tooth has a side and a back.

The automated optical inspection system for the runout tolerance of circular saw blades comprises a rotating device, a first optical inspection module, a second optical inspection module, a linear adjustment mechanism, and a computing device. The rotating device is used to rotate the circular saw blade. The first optical inspection module is used to capture a side image of the side of each tooth. The second optical inspection module is used to capture a back image of the back of each tooth. The computing device activates the rotating device to rotate the circular saw blade, and activates the first optical inspection module to capture the side image of each tooth upon rotation of the circular saw blade. The computing device performs a radial-position-calculating procedure according to the side images, to obtain an amount of radial runout.

In addition, the computing device activates the rotating device to rotate the circular saw blade, and activates the second optical inspection module to capture the back image of each tooth upon rotation of the circular saw blade. The computing device performs an axial-position-calculating procedure according to the back images, to obtain an amount of axial runout.

According to the automated optical inspection system for the runout tolerance of circular saw blades disclosed in the present invention, a non-contact optical inspection manner is used to eliminate the disadvantages caused in inspection by a contact dial indicator in the prior art.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
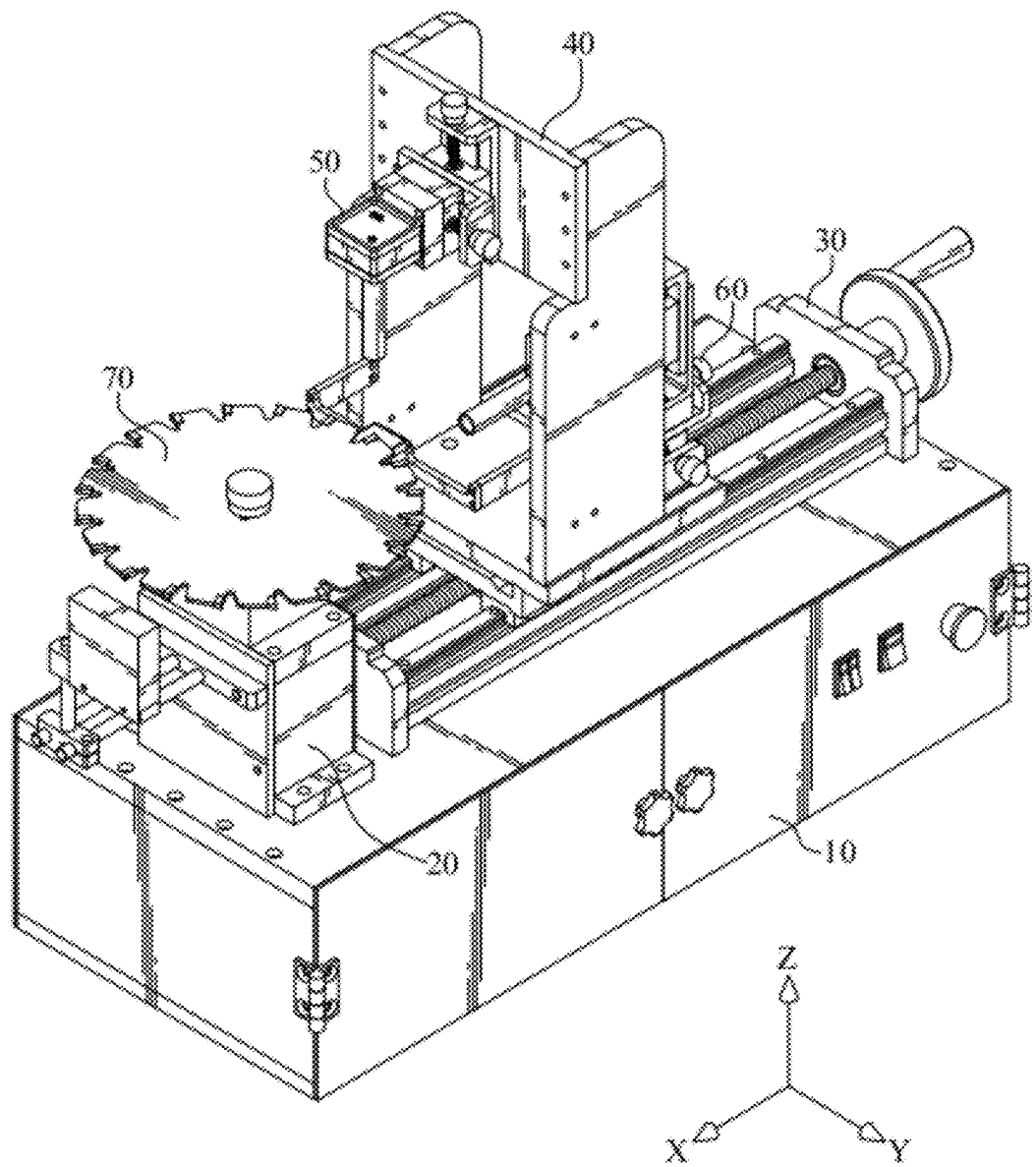
FIGS. 1A and 1B are schematic three-dimensional structural views of an automated optical inspection system for the runout tolerance of circular saw blades according to the present invention.
Figure 1B:
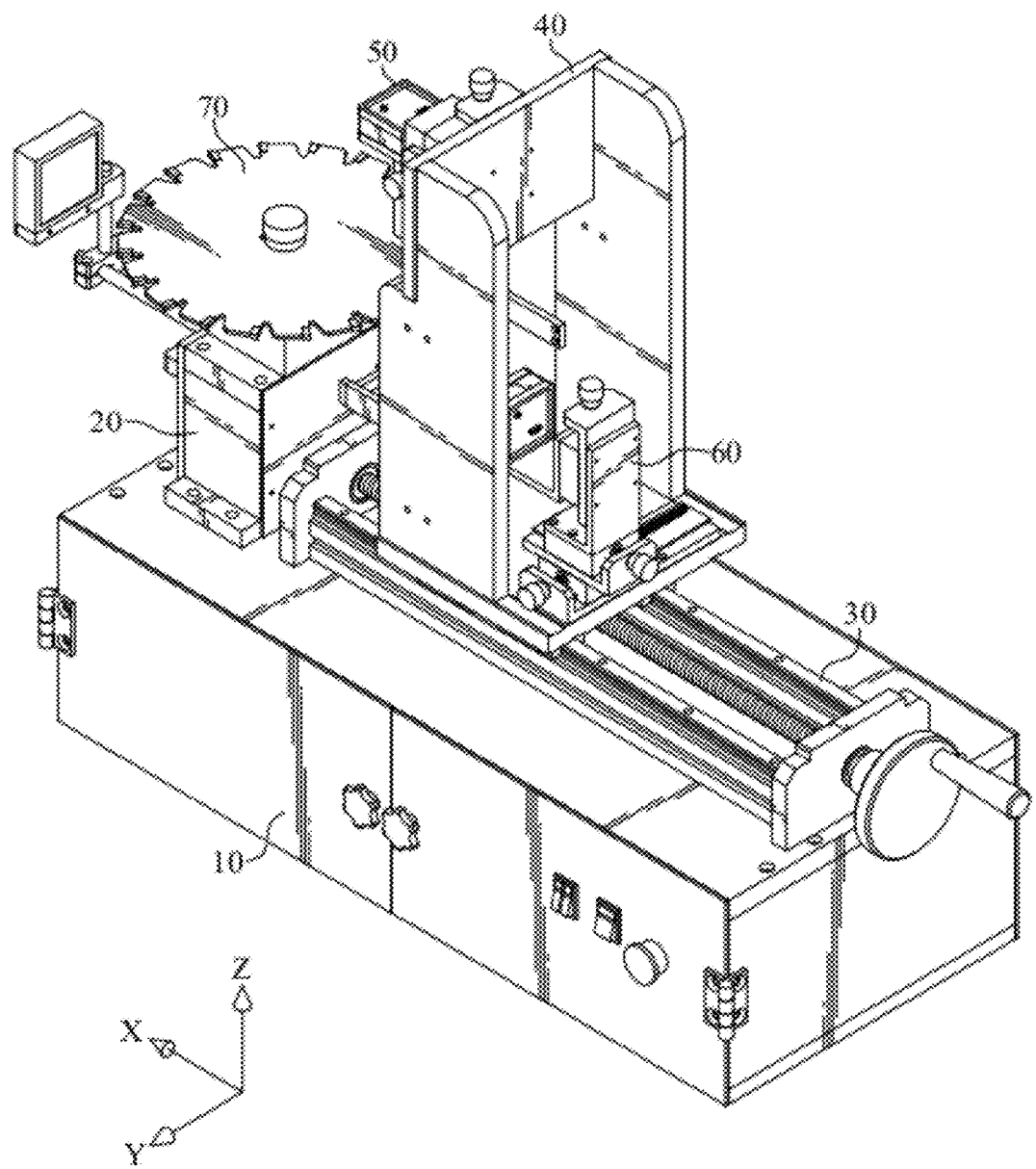
Figure 1C:
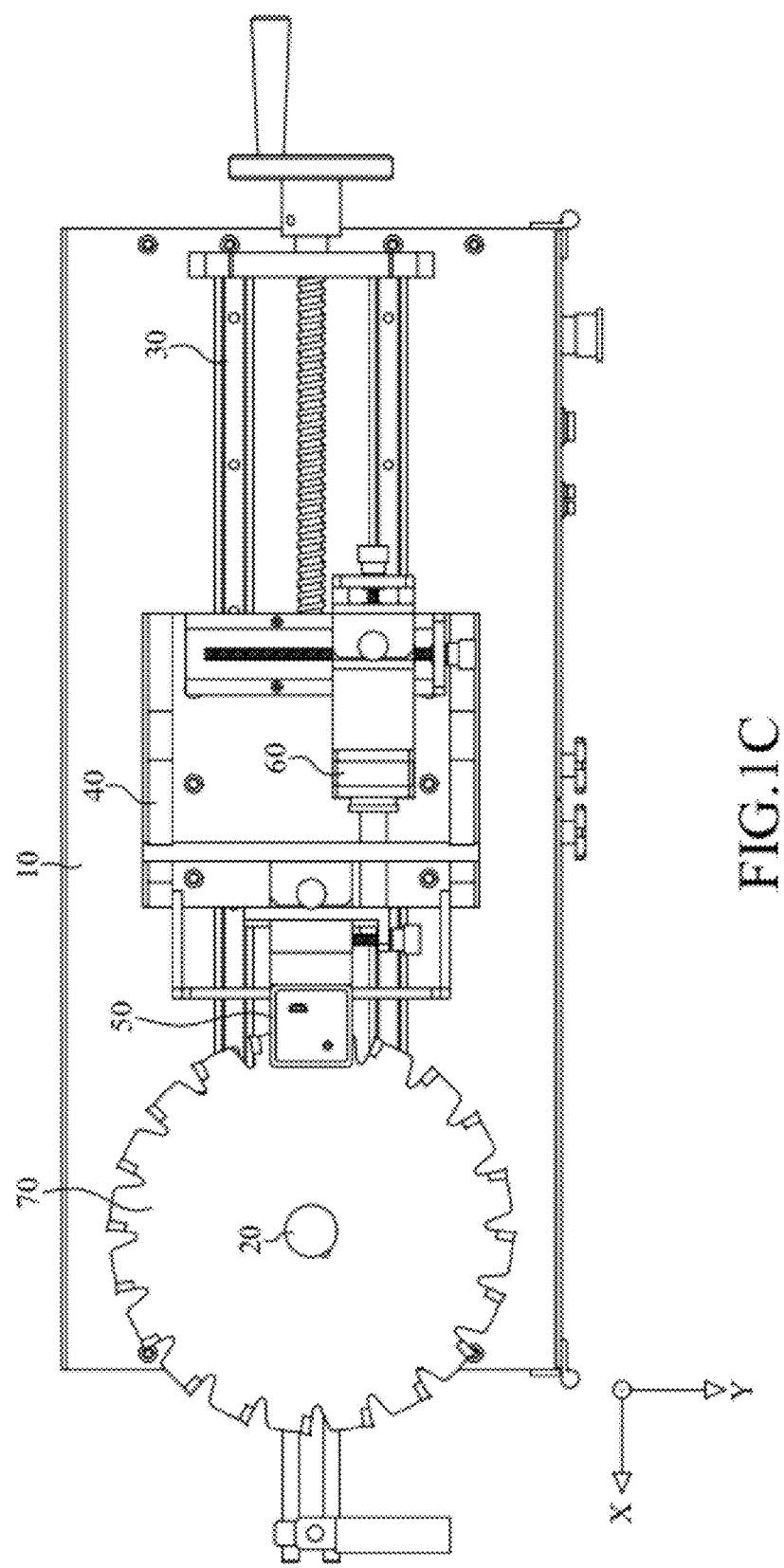
FIG. 1C is a top view of the automated optical inspection system for the runout tolerance of circular saw blades according to the present invention as shown in FIGS. 1A and 1B.

FIGS. 1A and 1B are three-dimensional structural views of an automated optical inspection system for the runout tolerance of circular saw blades according to the present invention, and FIG. 1C is a top view of the automated optical inspection system for the runout tolerance of circular saw blades according to the present invention. The automated optical inspection system for the runout tolerance of circular saw blades is used to inspect a runout amount, in which the runout amount includes an amount of radial runout and an amount of axial runout.

The automated optical inspection system for the runout tolerance of the circular saw blades comprises a base 10, a rotating device 20, a linear adjustment mechanism 30, a supporting frame 40, a first optical inspection module 50, and a second optical inspection module 60.

The rotating device 20, disposed on the base 10, is used to support and fix a circular saw blade 70, and provides the rotation driving force to the circular saw blade 70.

The linear adjustment mechanism 30 is disposed on the base 10, and the supporting frame 40, the first optical inspection module 50, and parts of the second optical inspection module 60 are disposed on the linear adjustment mechanism 30. The linear adjustment mechanism 30 is used to translate in an X-axis direction relative to the base 10, to enable the automated optical inspection system for the runout tolerance of circular saw blades to inspect the circular saw blades 70 of different sizes.

The supporting frame 40 is fixed on the linear adjustment mechanism 30, and may be, but not limited to, a gantry type frame.

The first optical inspection module 50 is fixed on the supporting frame 40, and used to inspect the amount of radial runout.

The second optical inspection module 60 is partially fixed on the supporting frame 40, and used to inspect the amount of axial runout.

The detailed structure of each portion of the automated optical inspection system for the runout tolerance of circular saw blades is described as follows.

Figure 2A:
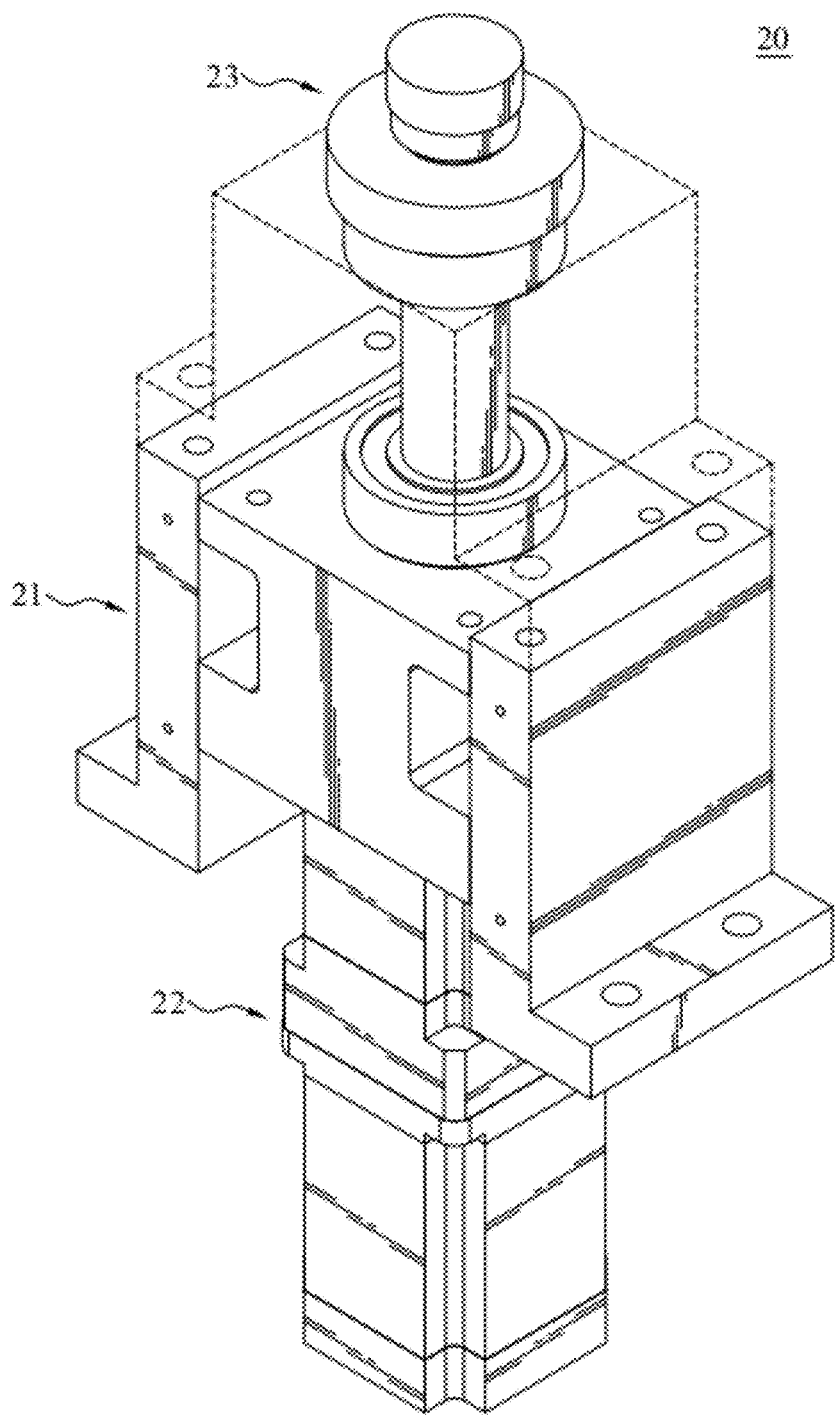
FIG. 2A is a three-dimensional structural view of a rotating device according to the present invention.

FIG. 2A is a three-dimensional structural view of the rotating device 20. The rotating device 20 comprises a main shaft holder 21, a motion mechanism 22, and a main shaft fixture 23. The main shaft holder 21 is disposed between the motion mechanism 22 and the main shaft fixture 23.

Figure 2B:
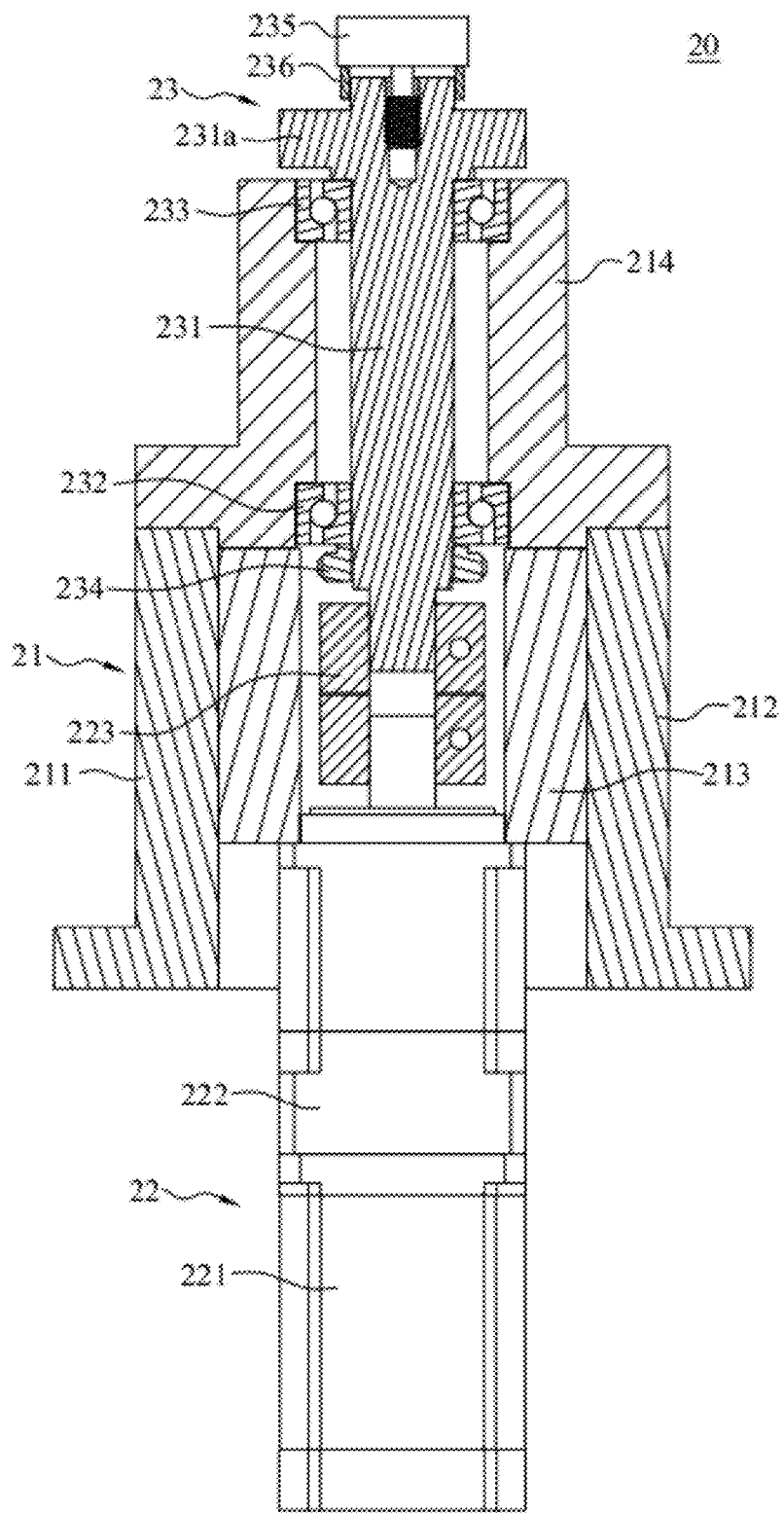
FIG. 2B is a sectional structural view of the rotating device according to the present invention.

FIG. 2B is a sectional structural view of the rotating device 20. The main shaft holder 21 comprises two lateral supporting blocks 211 and 212, a gear reducer adapting block 213, and a main shaft holding block 214. One side of the two lateral supporting blocks 211 and 212 is connected to the base 10, and the other side of the two lateral supporting blocks 211 and 212 is connected to the main shaft holding block 214. The main shaft holding block 214 has a through hole with cylindrical step. The gear reducer adapting block 213, having a cylindrical through hole, is fixed below the main shaft holding block 214 and disposed between the two lateral supporting blocks 211 and 212.

The motion mechanism 22 comprises a stepping motor 221, a gear reducer 222, and a coupling 223. A rotary shaft of the stepping motor 221 is connected to an input end of the gear reducer 222, and an output end of the gear reducer 222 is connected to the coupling 223. An end surface of the gear reducer 222 is fixed below the gear reducer adapting block 213. The coupling 223 is disposed in the cylindrical through hole of the gear reducer adapting block 213.

The main shaft fixture 23 comprises a main shaft 231, a bearing 232, a bearing 233, a bearing locknut 234, a main shaft head screw 235, and a main shaft bush 236. The main shaft 231 is disposed in the through hole with cylindrical step of the main shaft holding block 214 with the use of bearings 232 and 233. The bearing locknut 234 is screwed at a position on the main shaft 231 and adjacent to the bearing 232, and is used to generate a preload between the bearings 232 and 233 to eliminate clearance. The bearings 232 and 233 may be, but not limited to, single-row angular contact ball bearings with a back-to-back arrangement. One end of the main shaft 231 is connected to the coupling 223, such that the stepping motor 221 is enabled to drive the main shaft 231 to rotate. The other end of the main shaft 231 has a circular saw blade supporting portion 231a. The circular saw blade 70, when being inspected, can be placed on the circular saw blade supporting portion 231a and fixed by the main shaft head screw 235 and the main shaft bush 236. The axial direction of the main shaft 231 is parallel to a Z-axis direction.

Figure 3:
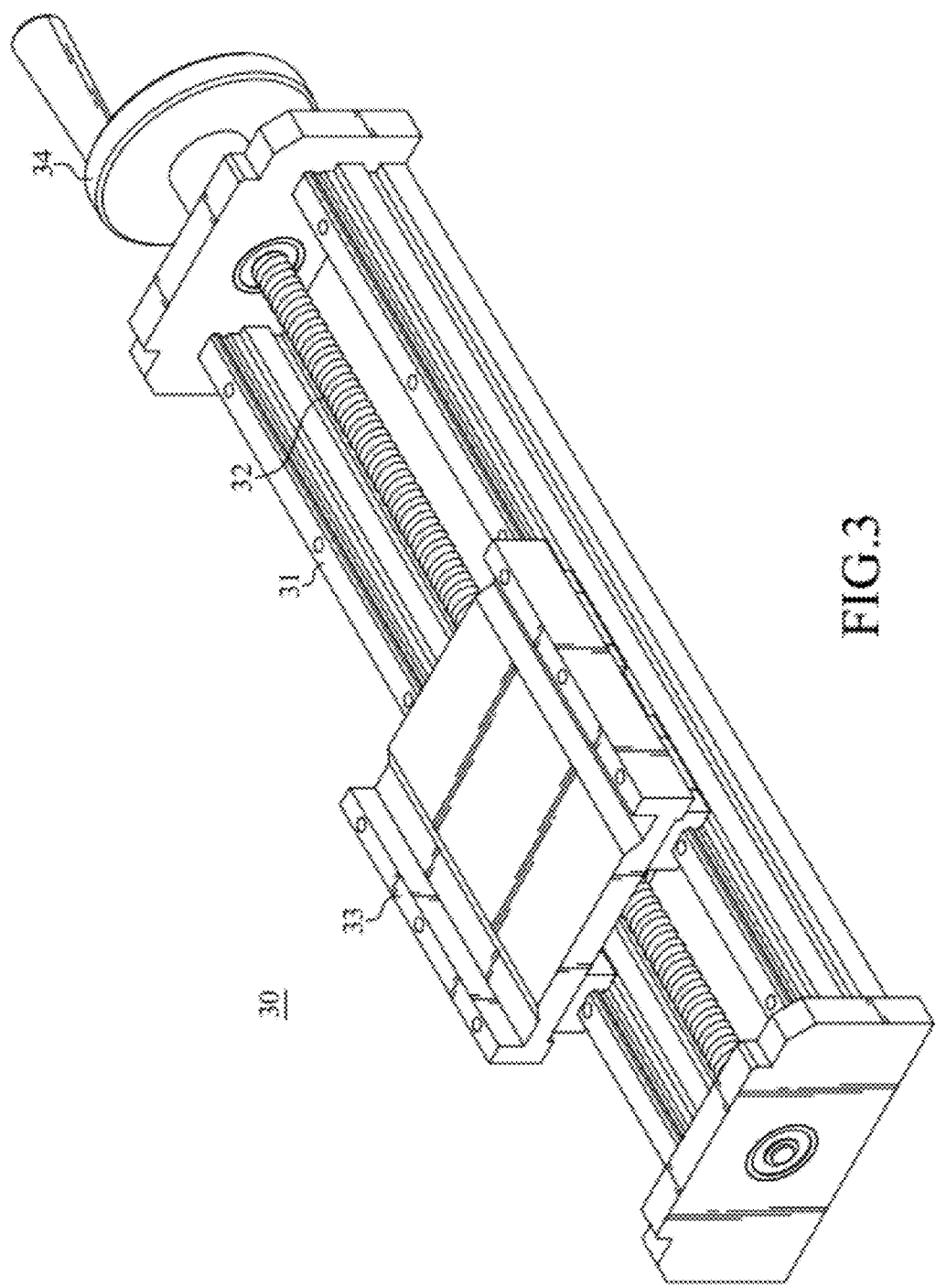
FIG. 3 is a three-dimensional structural view of a linear adjustment mechanism according to the present invention.

FIG. 3 is a three-dimensional structural view of the linear adjustment mechanism 30. The linear adjustment mechanism 30 comprises a main structural body 31, a lead screw 32, a sliding platform 33, and a handwheel 34. The main structural body 31 is connected to and fixed on the base 10. The sliding platform 33 is located above the main structural body 31. The lead screw 32 and the sliding platform 33 are connected with each other through a helical kinematic pair. The handwheel 34 can be rotated manually to drive the lead screw 32, so as to cause translation of the sliding platform 33 along an X-axis direction relative to the main structural body 31.

Figure 4:
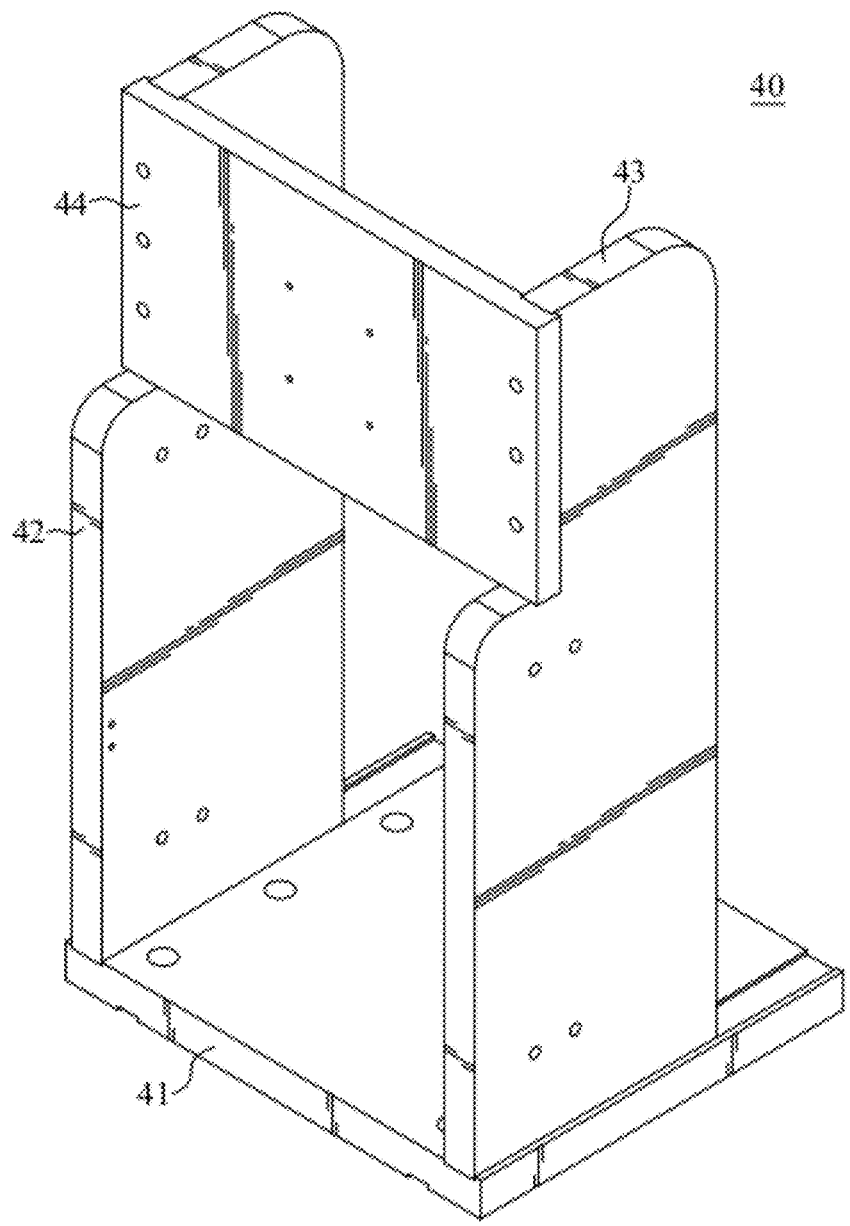
FIG. 4 is a three-dimensional structural view of a supporting frame according to the present invention.

FIG. 4 is a three-dimensional structural view of the supporting frame 40. The supporting frame 40 comprises a bottom plate 41, a left side plate 42, a right side plate 43, and an upper supporting plate 44. The bottom plate 41 is fixed on the sliding platform 33, and has two grooves on a surface thereof. The left side plate 42 and the right side plate 43 are respectively disposed in the grooves of the bottom plate 41. The upper supporting plate 44 is fixed on a side surface of the left side plate 42 and the right side plate 43.

Figure 5:
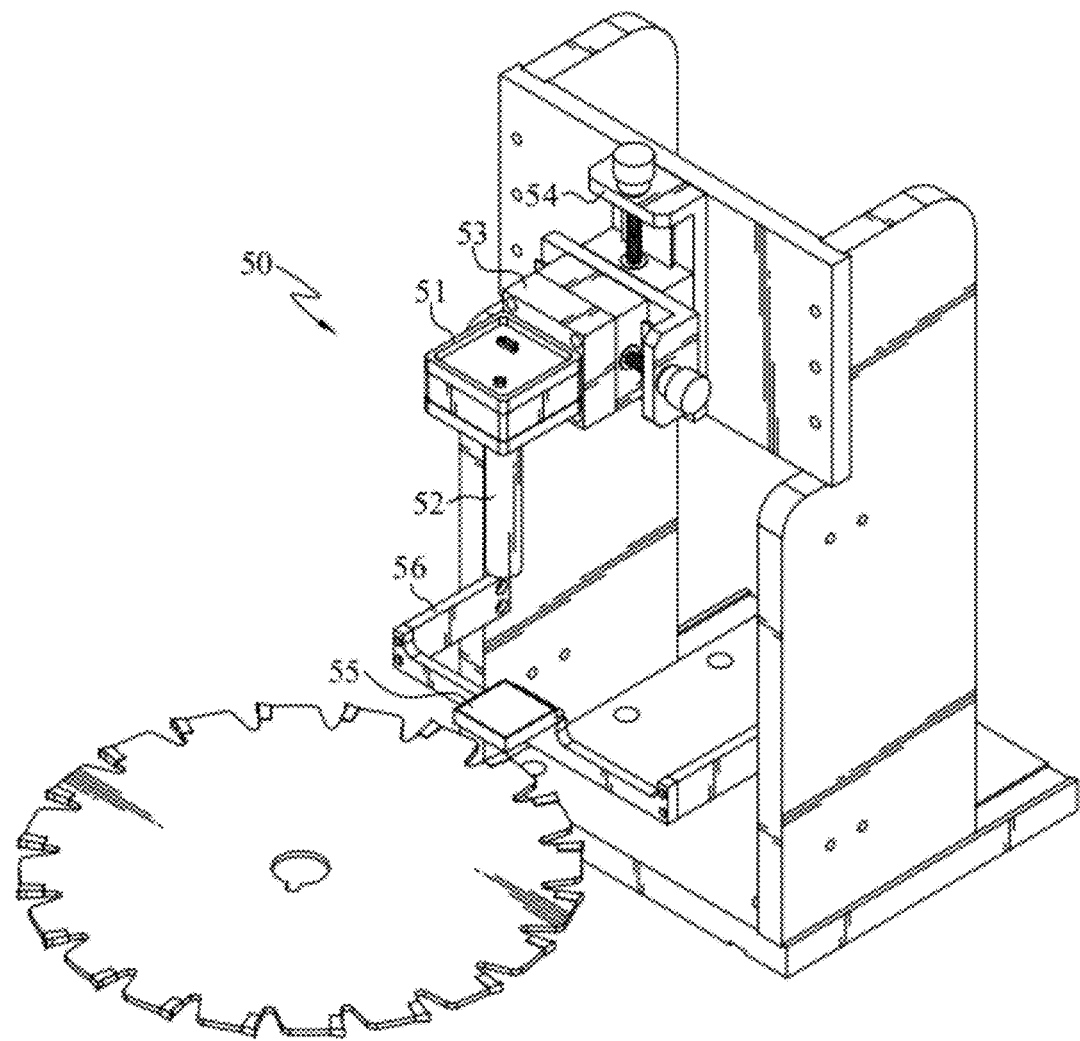
FIG. 5 is a three-dimensional structural view of a first optical inspection module according to the present invention.

FIG. 5 is a three-dimensional structural view of the first optical inspection module 50. The first optical inspection module 50 comprises a first image sensing unit 51, a first lens 52, a first adapting block 53, a dual-axis fine tuning table 54, a first backlight illumination device 55, and a first backlight illumination device supporting assembly 56. The first image sensing unit 51 is connected to an imaging end of the first lens 52. The first image sensing unit 51 may be a charge-coupled device camera (CCD) or a complementary metal-oxide-semiconductor camera (CMOS), and may have a universal serial bus (USB) connection interface. One side of the first image sensing unit 51 is connected to the first adapting block 53 fixed on the dual-axis fine tuning table 54. The dual-axis fine tuning table 54 is disposed on the upper supporting plate 44. The first image sensing unit 51 and the first lens 52, which can be adjusted by the dual-axis fine tuning table 54, may move in the Y-axis and Z-axis directions relative to the upper supporting plate 44. The first backlight illumination device 55 is disposed on the first backlight illumination device supporting assembly 56, and the first backlight illumination device supporting assembly 56 is disposed on both the left side plate 42 and the right side plate 43.

An optical axis of the first lens 52 is parallel to a rotation axis of the circular saw blade 70 and also parallel to an axial direction of the main shaft 231, and the first backlight illumination device 55 is correspondingly disposed in a capture range of the first lens 52, so as to provide light for illumination. In inspecting the circular saw blade 70, the dual-axis fine tuning table 54 may be adjusted, to locate the circular saw blade 70 in the capture range of the first lens 52.

Figure 6:
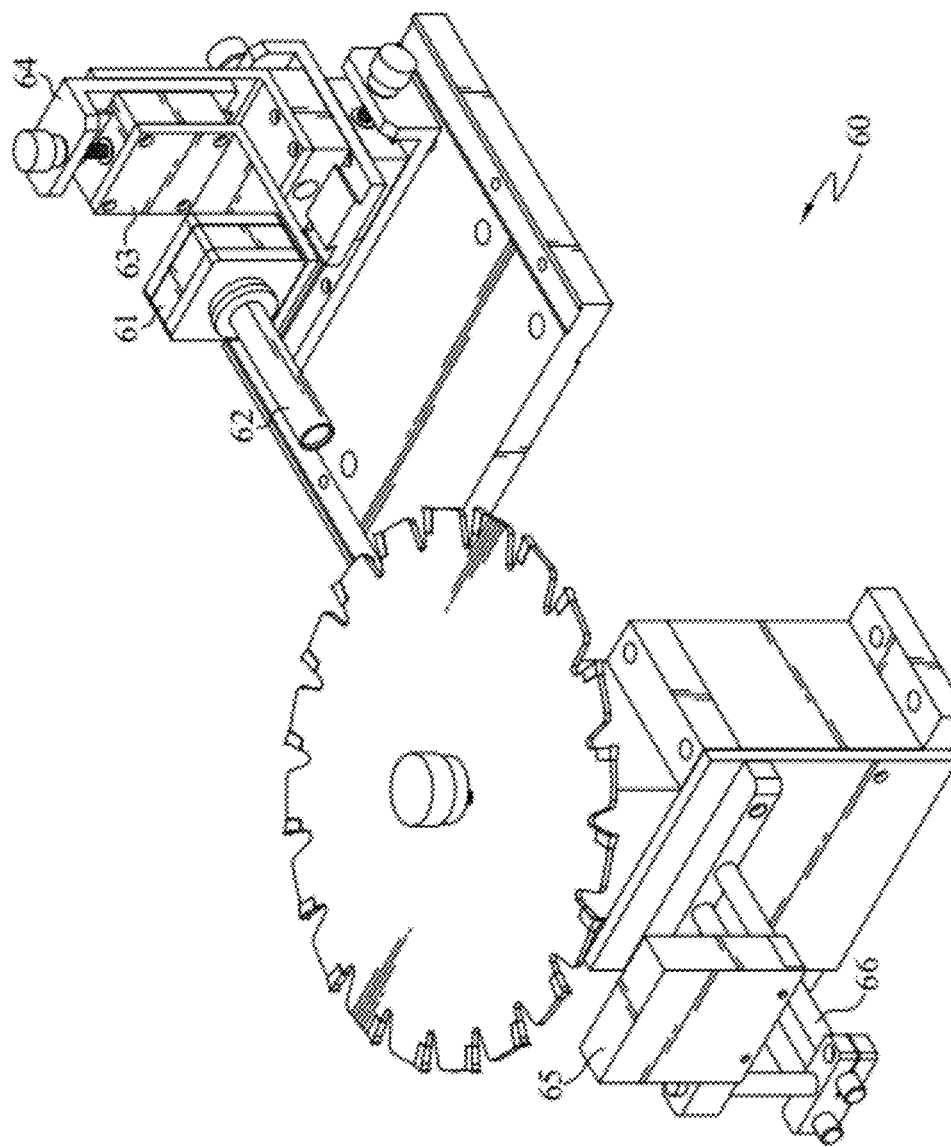
FIG. 6 is a three-dimensional structural view of a second optical inspection module according to the present invention.

FIG. 6 is a three-dimensional structural view of the second optical inspection module 60. The second optical inspection module 60 comprises a second image sensing unit 61, a second lens 62, a second adapting block 63, a three-axis fine tuning table 64, a second backlight illumination device 65, and a second backlight illumination device supporting assembly 66. The second image sensing unit 61 is connected to an imaging end of the second lens 62. The second image sensing unit 61 may be a CCD camera or a CMOS camera, and may have a USB connection interface. The second image sensing unit 61 and the second lens 62 are connected to the three-axis fine tuning table 64 through the second adapting block 63. The three-axis fine tuning table 64 is fixed on the bottom plate 41, and may move in the X-axis, Y-axis, and Z-axis directions relative to the bottom plate 41. The second backlight illumination device 65 is disposed on the second backlight illumination device supporting assembly 66, and the second backlight illumination device supporting assembly 66 is connected to one side of the main shaft holder 21.

An optical axis of the second lens 62 is perpendicular to a rotation axis of the circular saw blade 70 and also perpendicular to an axial direction of the main shaft 231, and the second backlight illumination device 65 is correspondingly disposed in a capture range of the second lens 62, so as to provide light for illumination. In inspecting the circular saw blade 70, the three-axis fine tuning table 64 may be adjusted, to locate the circular saw blade 70 in the capture range of the second lens 62.

Figure 7:
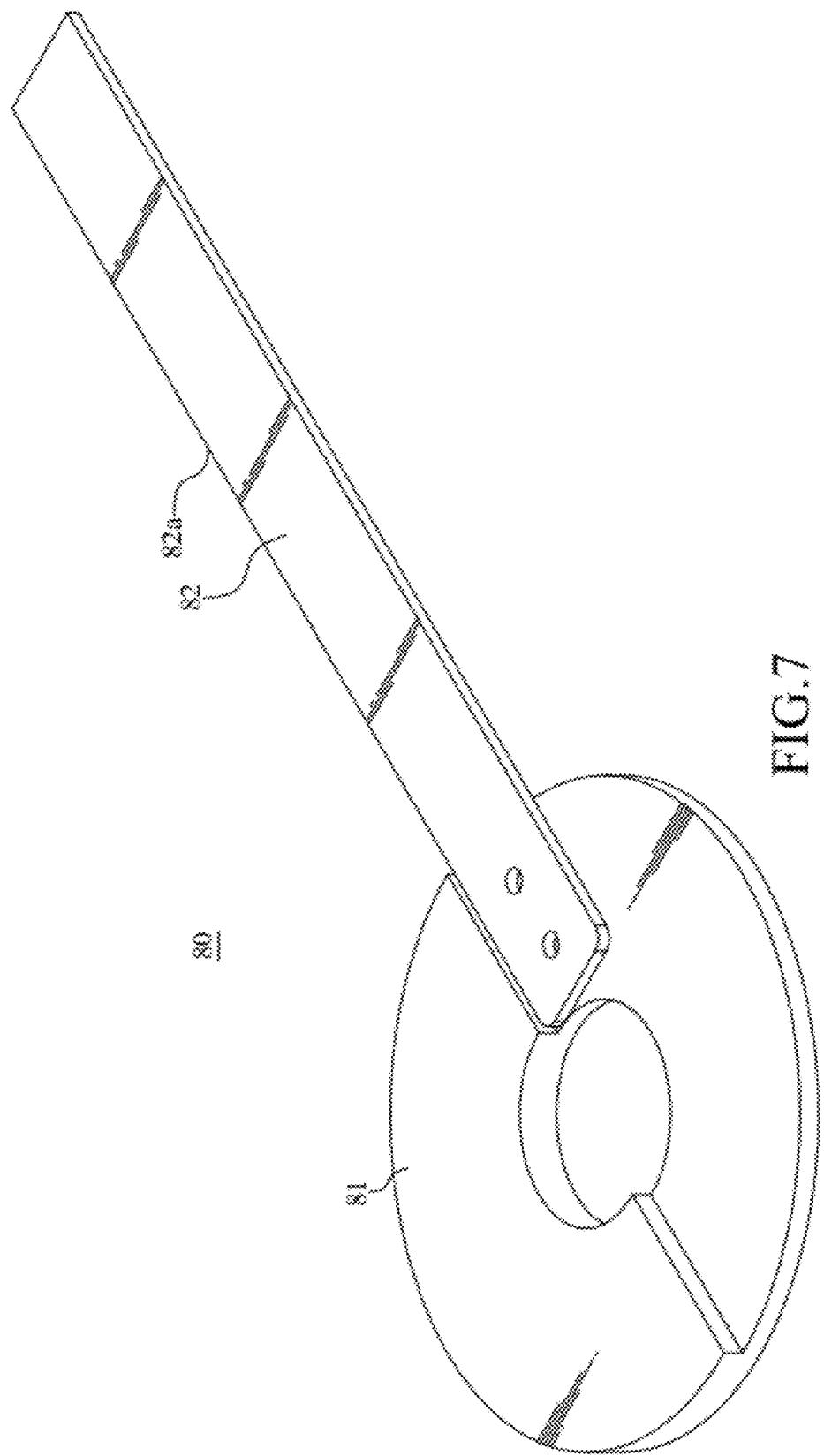
FIG. 7 is a three-dimensional structural view of a calibration gauge according to the present invention.

FIG. 7 is a three-dimensional structural view of a calibration gauge 80. The calibration gauge 80 comprises a precision circular disk 81 and a calibration ruler 82. The calibration ruler 82 has a ruler edge 82*a*. An extension line of the ruler edge 82*a* substantially passes through a circular center of the precision circular disk 81. Before inspection, a calibration procedure is performed first, by placing the calibration gauge 80 on the circular saw blade supporting portion 231*a* of the main shaft 231, and then fixing the calibration gauge 80 by screwing the main shaft head screw 235. The rotating device 20 drives the calibration gauge 80 to rotate to a suitable position, an image of the ruler edge 82*a* of the calibration ruler 82 is captured by the first optical inspection module 50, and a reference axis 82*b* is obtained by detecting an edge contour of the ruler edge 82*a* in the image. The reference axis 82*b* is used as a radial reference axis in inspecting the amount of radial runout, and the reference axis 82*b* is preferably parallel to a longitudinal direction of the image (a vertical alignment direction of the pixels).

Figure 8:
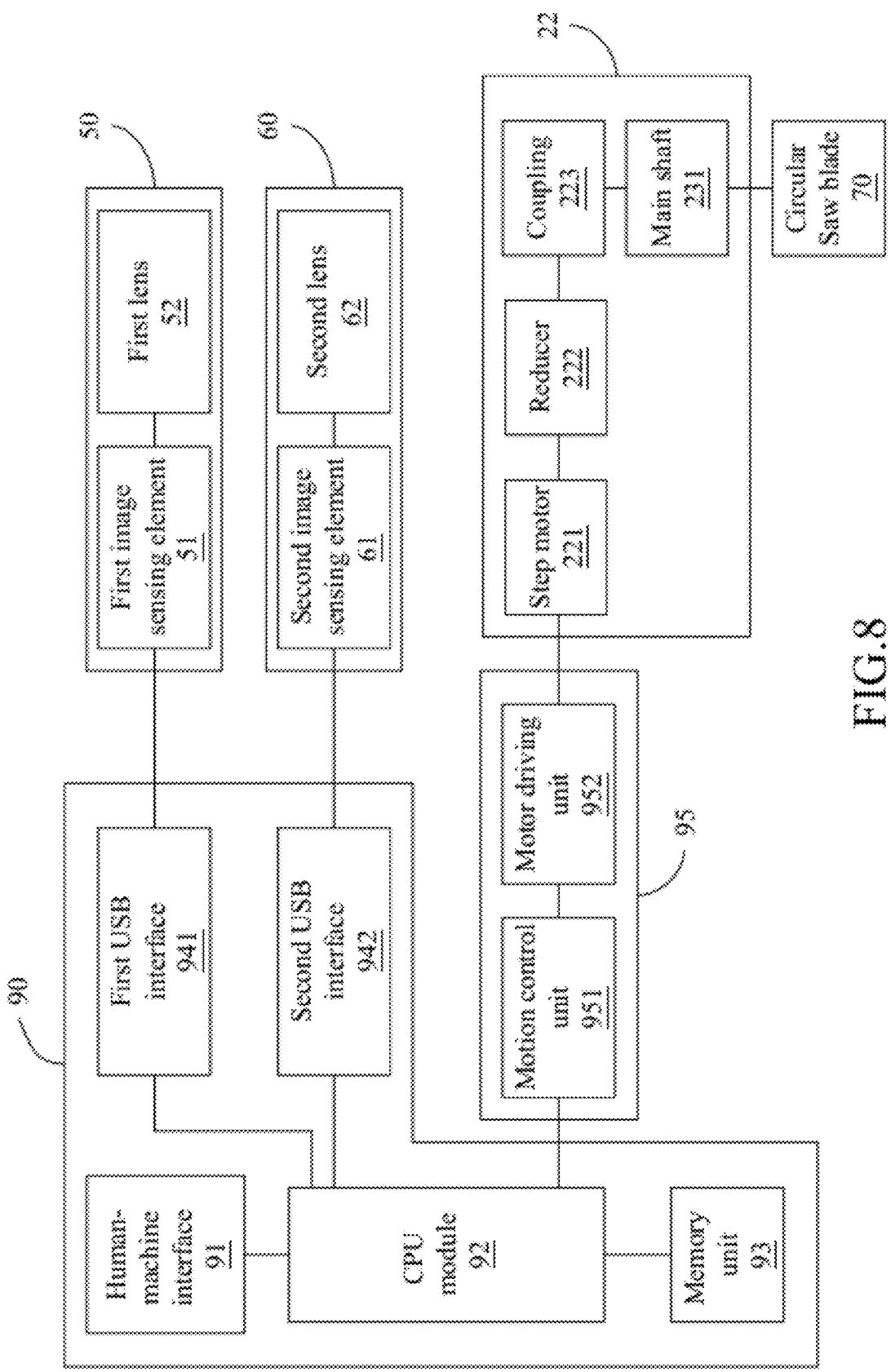
FIG. 8 is a schematic structural block diagram of the system integration of the present invention.

FIG. 8 is a schematic structural block diagram of the system integration of the present invention. According to the present invention, the automated optical inspection system for the runout tolerance of circular saw blades further comprises a computing device 90 and a motion control module 95 attached to the motion mechanism 22. The computing device 90 may be an external personal computer (PC), or a controller integrated into the base 10. The computing device 90 is electrically connected to the motion control module 95, the first optical inspection module 50, and the second optical inspection module 60. The motion control module 95 is electrically connected to the motion mechanism 22. The computing device 90 comprises a human-machine interface 91, a central processing unit (CPU) module 92, a memory unit 93, a first USB interface 941, and a second USB interface 942. The computing device 90 may drive the stepping motor 221 in the motion mechanism 22 to rotate through a motion control unit 951 and a motor driving unit 952 in the motion control module 95, and the stepping motor 221 drives the main shaft 231 to rotate through the gear reducer 222 and the coupling 223, so as to rotate the circular saw blade 70 fixed above the main shaft 231. The first image sensing unit 51 of the first optical inspection module 50 and the second image sensing unit 61 of the second optical inspection module 60 are respectively connected to the first USB interface 941 and the second USB interface 942 of the computing device 90, to transfer the image data to the computing device 90. In the computing device 90, the human-machine interface 91 may be stored, which may be used for providing an input operation instruction to a user and displaying a result. The CPU module 92 is used to perform a radial-position-calculating procedure and an axial-position-calculating procedure. The memory unit 93 is used to store the radial-position-calculating procedure and the axial-position-calculating procedure. The detailed process and principle of the radial-position-calculating procedure and the axial-position-calculating procedure are described as follows.

Figure 9:
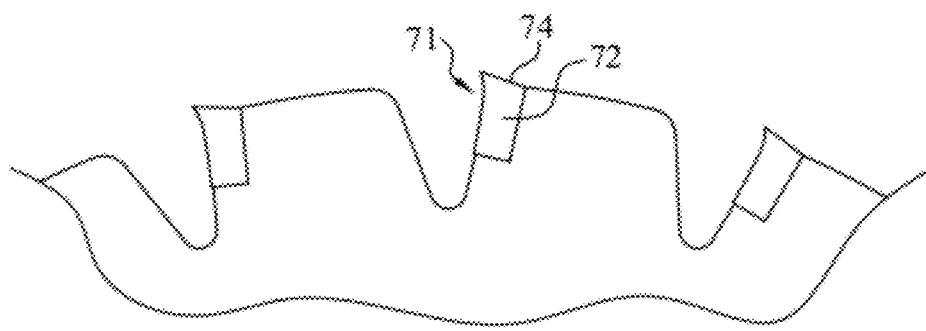
FIG. 9 is a schematic outside view of a tooth according to the present invention.

FIG. 9 is a schematic outside view of a tooth. Each tooth 71 has a side 72 and a back 74.

Figure 10A:
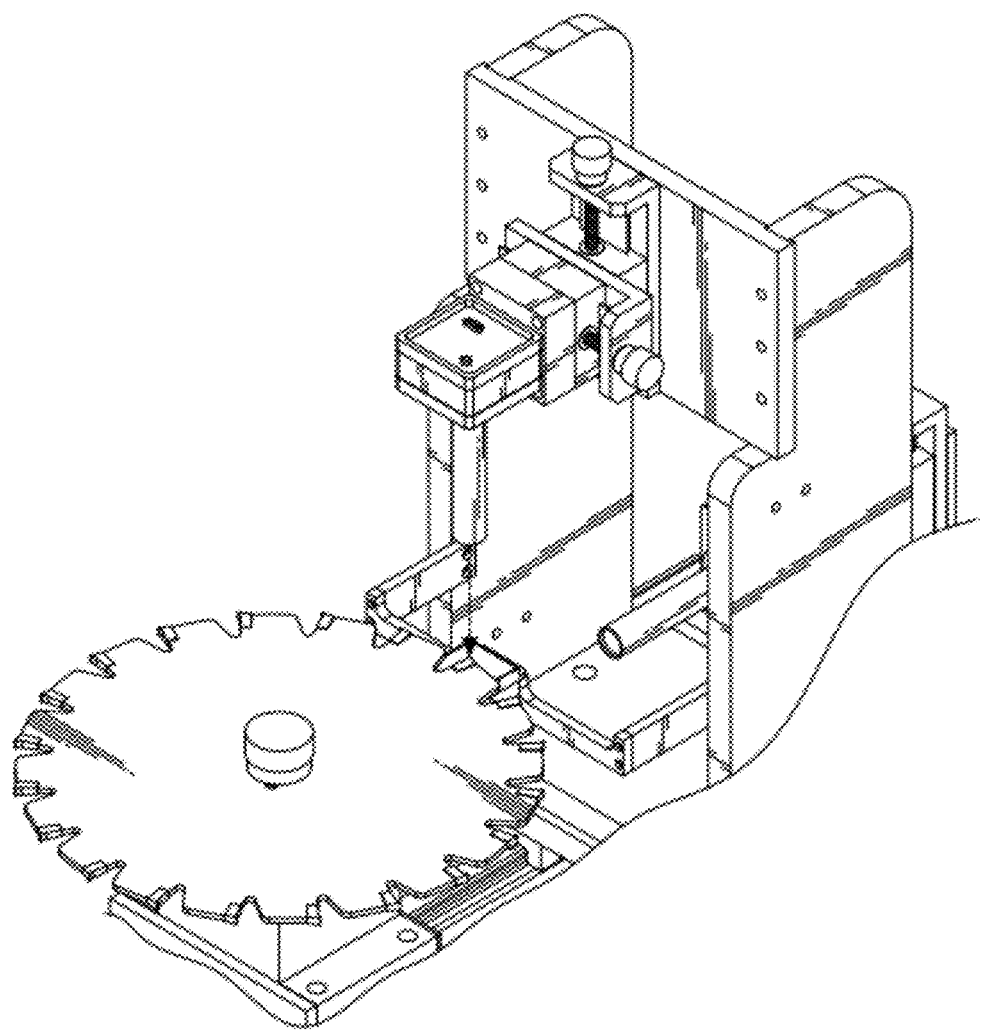
FIG. 10A is a schematic view of capturing a side image by a first optical inspection module according to the present invention.

FIG. 10A is a schematic view of capturing a side image by the first optical inspection module. The first optical inspection module 50 captures an image with a backlight source, so that in the side image, the physical body of the circular saw blade 70 appears as a shadow part with pixels of lower grayscale values, and the background is a blank part with pixels of higher grayscale values.

In inspection, the computing device 90 activates the rotating device 20 to rotate the circular saw blade 70, and activates the first optical inspection module 50 to capture the side image of each tooth upon rotation of the circular saw blade 70. The computing device 90 performs the radial-position-calculating procedure on each side image, to obtain the amount of radial runout.

The radial-position-calculating procedure may be sub-divided into a preliminary positioning sub-procedure, an edge detection sub-procedure, and a precise positioning sub-procedure.

Figure 10B:
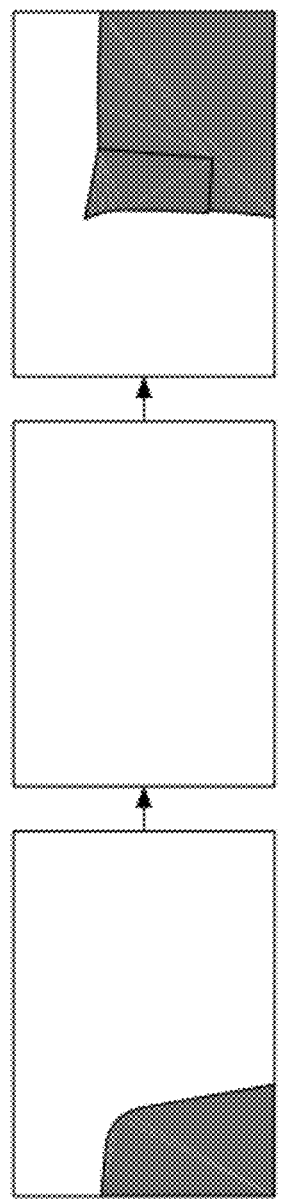
FIG. 10B is a schematic view of a preliminary positioning sub-procedure according to the present invention.

FIG. 10B is a schematic view of a preliminary positioning sub-procedure. In the preliminary positioning sub-procedure, the computing device 90 may determine whether the image captured by the first optical inspection module 50 is a blank image. If not, the computing device 90 controls the rotating device 20 to rotate the circular saw blade 70 clockwise, and gradually captures the side image by using the first optical inspection module 50, until the captured image is a blank image. Then, the computing device 90 further controls the rotating device 20 to rotate the circular saw blade 70 counterclockwise, and gradually captures the side image by using the first optical inspection module 50, until a grayscale value of the side image is changed, and when the change of the grayscale value occurs at a central region of the captured image, that is, the tooth is located at the central region of the side image, the preliminary positioning sub-procedure is completed.

In addition, the computing device 90 may perform determination according to a statistical value of the grayscale values in the captured image. For example, the computing device 90 computes an average value of the grayscale values in the image, and when the average value is greater than a critical value, the tooth is determined to be located at the central region of the side image.

Figure 10C:
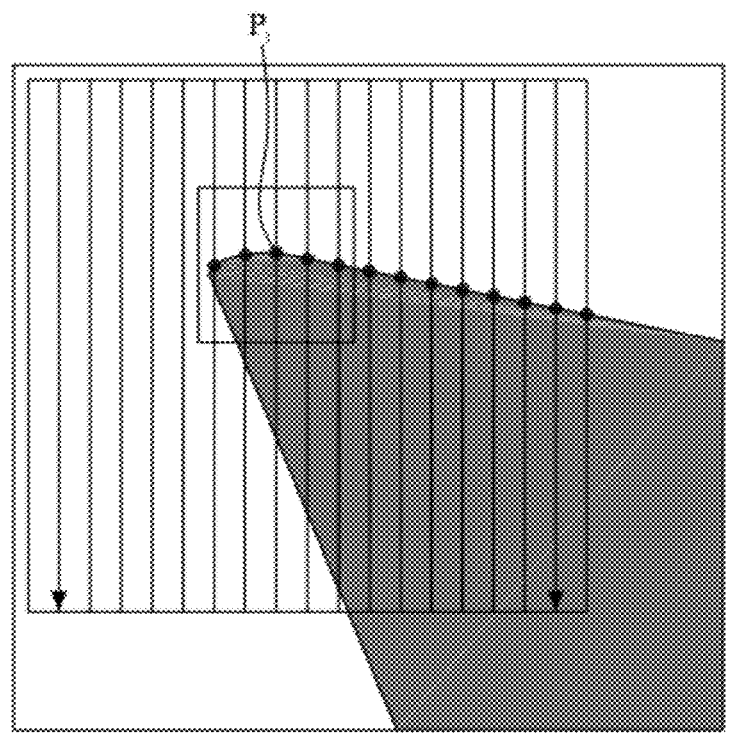
FIGS. 10C and 10D are schematic views of an edge detection sub-procedure according to the present invention.
Figure 10D:
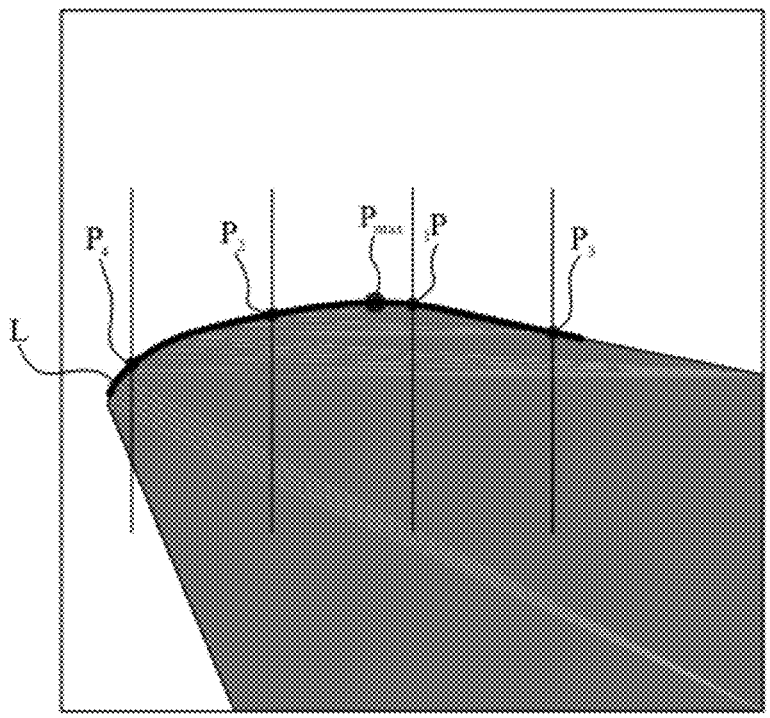

FIGS. 10C and 10D are schematic views of an edge detection sub-procedure. In the edge detection sub-procedure, the computing device 90 determines whether an obvious change exists between the grayscale values of two adjacent pixels in the image captured by the first optical inspection module 50, to inspect a contour of the tooth. The computing device 90 may perform the edge detection sub-procedure on pixels in each column of the side image, to obtain coordinates of multiple edge points. Then, the computing device 90 finds a first highest point $P_1$, a second highest point $P_2$, and several adjacent points $P_3$ and $P_4$ from the edge points to further obtain a fitted curve L by using a curve fitting method according to the coordinates of the found points. Afterward, the computing device 90 computes a fitted end point $P_{max}$ of the tooth according to the fitted curve L. The coordinate of the fitted end point $P_{max}$ is a highest point on the fitted curve L, which represents a top position of the tooth in the side image, that is, a position of an apex (tip) of the tooth. An image positioning resolution of the fitted end point $P_{max}$ obtained by the edge detection sub-procedure can achieve the subpixel level.

Figure 10E:
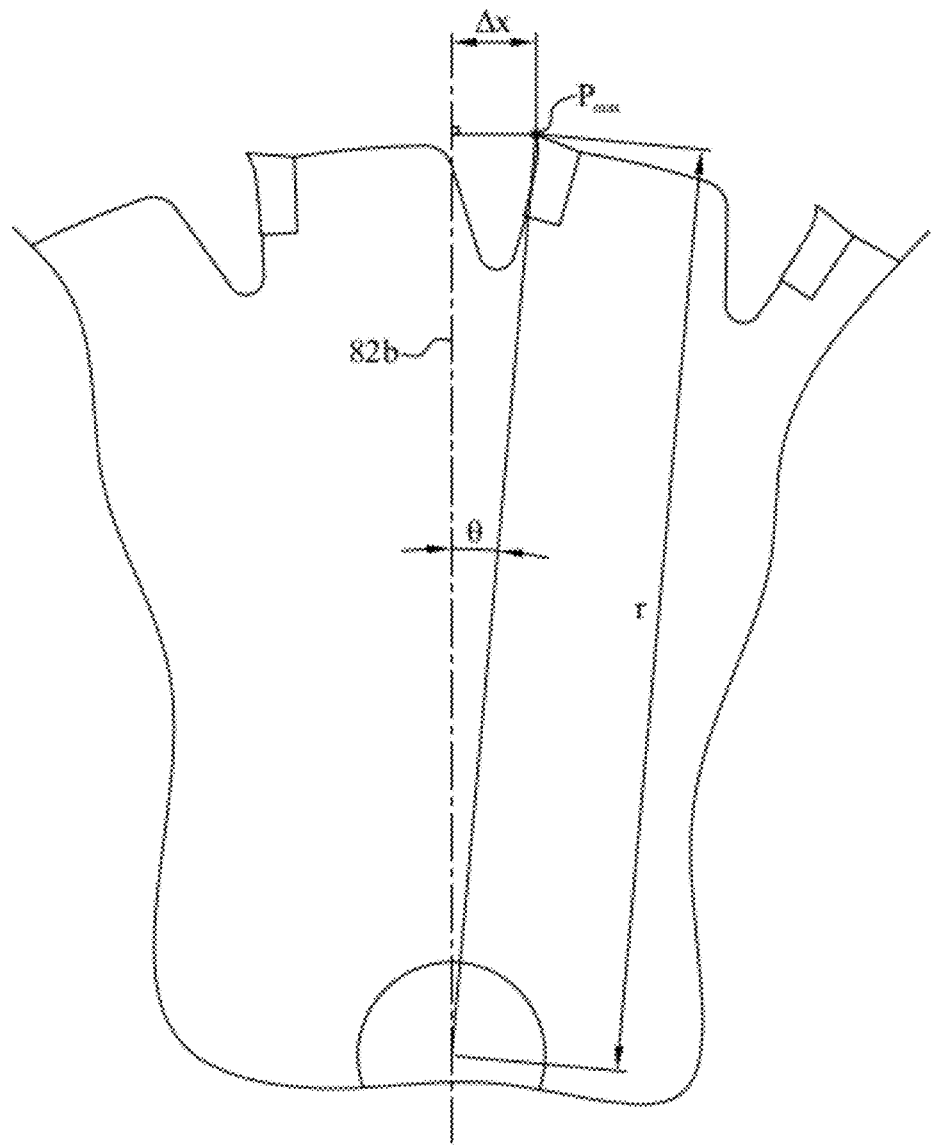
FIG. 10E is a schematic view of a precise positioning sub-procedure according to the present invention.

FIG. 10E is a schematic view of a precise positioning sub-procedure. In the precise positioning sub-procedure, the computing device 90 computes a fine tuning angle of the circular saw blade 70 according to the fitted end point $P_{max}$, the reference axis 82b, and a default radius of the circular saw blade 70 (which may be a nominal radius of the circular saw blade 70). The reference axis 82b is obtained by the calibration gauge 80 in the calibration procedure. The fine tuning angle may be computed by using a trigonometric function principle, and the fine tuning angle $\theta \approx \sin^{-1}(\Delta x/r)$, in which $\Delta x$ is a normal distance from the fitted end point $P_{max}$ to the reference axis 82b, and r is the default radius of the circular saw blade 70. The computing device 90 may further control the rotating device 20 according to the fine tuning angle $\theta$, to adjust an angular position of the circular saw blade 70.

The computing device 90 may repeatedly perform the edge detection sub-procedure and the precise positioning sub-procedure, until the normal distance $\Delta x$ is smaller than a threshold value. When the normal distance $\Delta x$ is smaller than the threshold value, it indicates that the position of the apex (tip) of the tooth is quite close to the reference axis 82b. Therefore, the computing device 90 can compute a corresponding radial position of the apex of the tooth in the side image according to the fitted end point $P_{max}$.

Then, the computing device 90 controls the rotating device 20 to rotate the circular saw blade 70 to a next tooth, and performs the radial-position-calculating procedure. After performing the radial-position-calculating procedure on each tooth, multiple radial positions are obtained. The computing device 90 finds a highest position and a lowest position from the radial positions, and computes a difference between the highest position and the lowest position, to obtain the amount of radial runout.

Figure 11A:
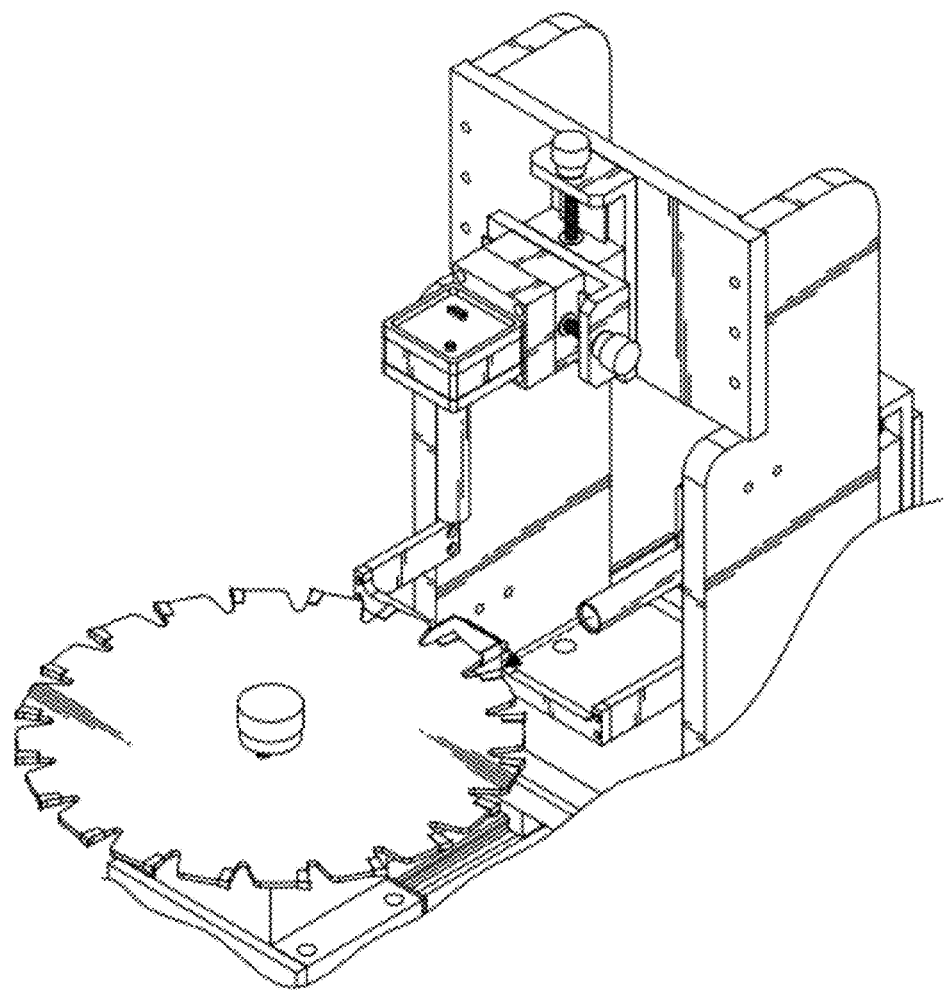
FIG. 11A is a schematic view of capturing a back image by a second optical inspection module according to the present invention.
Figure 11B:
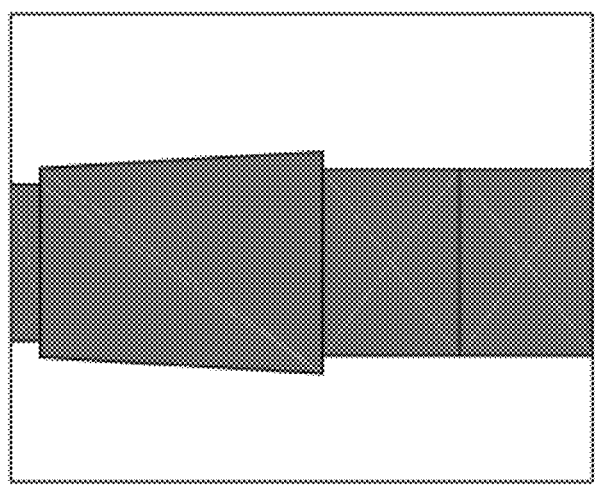
FIG. 11B is a schematic view of a back image according to the present invention.

FIG. 11A is a schematic view of capturing a back image by the second optical inspection module, and FIG. 11B is a schematic view of the back image. The second optical inspection module 60 captures an image with a backlight source, so that in the back image, the physical body of the circular saw blade 70 appears as a shadow part with pixels of lower grayscale values, and the background is a blank part with pixels of higher grayscale values. In addition, a longitudinal direction (a vertical direction) of the back image (a vertical alignment direction of the pixels) is parallel to the axial direction of the main shaft 231.

The computing device 90 activates the second optical inspection module 60 to capture the back image of each tooth upon rotation of the circular saw blade 70, and performs the axial-position-calculating procedure on each back image, to obtain the amount of axial runout.

The axial-position-calculating procedure may be performed at the same time with the radial-position-calculating procedure. After the precise positioning sub-procedure in the axial-position-calculating procedure is completed, the edge detection sub-procedure in the axial-position-calculating procedure may be performed on the back image (similar to the procedure as shown in FIGS. 10C and 10D), to obtain upper boundary contour edge points and lower boundary contour edge points of the tooth in the back image, and compute coordinates of an upper boundary fitted end point and a lower boundary fitted end point. Specifically, in computing the lower boundary fitted end point, the computing device 90 finds a first lowest point, a second lowest point, and several adjacent points from the lower boundary contour edge points of the back image, and computes a lower boundary fitted end point by using a curve fitting method according to coordinates of the found points, in which the coordinate of the lower boundary fitted end point is a lowest point on the fitted curve. The coordinates of the upper boundary fitted end point and the lower boundary fitted end point are respectively an upper boundary axial position and a lower boundary axial position of the tooth in the back image.

Likewise, after performing the axial-position-calculating procedure on each tooth, the computing device 90 obtains multiple upper boundary axial positions and lower boundary axial positions. The computing device 90 finds a highest position and a lowest position from the upper boundary axial positions, and calculates a difference between the highest position and the lowest position, to obtain the amount of radial runout of the upper boundary. Similarly, the computing device 90 finds a highest position and a lowest position from the lower boundary axial positions, and calculates a difference between the highest position and the lowest position, to obtain the amount of axial runout of the lower boundary.

In order to test the automated optical inspection system for the runout tolerance of circular saw blades according to the present invention, experiments were respectively conducted with two different circular saw blade samples being inspected by using a prototype built according to the above embodiments. The first sample was a circular saw blade 70 having an outer diameter of 100 mm, a thickness of 2.5 mm, and a tooth number of 10. The second sample was a circular saw blade 70 having an outer diameter of 200 mm, a thickness of 2.5 mm, and a tooth number of 20. In the experiments, inspections were repeated ten times for each sample.

Table 1 shows an inspecting result of the amount of radial runout of the first sample, in which a mean value of the amount of radial runout was 26.22 μm (micrometer), and the repeatability thereof, defined as ±3 times of a standard deviation, was ±1.22 μm. Table 2 shows an inspecting result of the amount of axial runout of the first sample, in which a mean value of the amount of axial runout of the upper boundary was 52.83 μm, and the repeatability thereof was ±1.85 μm; and a mean value of the amount of axial runout of the lower boundary was 40.73 μm, and the repeatability thereof was ±1.11 μm.

TABLE 1

| | The amount of radial runout (μm) |
|---|---|
| Test 1 | 26.16 |
| Test 2 | 26.25 |

TABLE 1-continued

| | The amount of radial runout (μm) |
|---|---|
| Test 3 | 25.53 |
| Test 4 | 26.26 |
| Test 5 | 26.31 |
| Test 6 | 25.79 |
| Test 7 | 27.09 |
| Test 8 | 26.05 |
| Test 9 | 26.36 |
| Test 10 | 26.36 |
| Mean value | 26.22 |
| Standard deviation | 0.41 |
| Repeatability | ±1.22 |

TABLE 2

| | The amount of axial runout of the upper boundary (μm) | The amount of axial runout of the lower boundary (μm) |
|---|---|---|
| Test 1 | 52.34 | 40.47 |
| Test 2 | 53.15 | 40.84 |
| Test 3 | 52.79 | 40.82 |
| Test 4 | 53.25 | 40.75 |
| Test 5 | 52.40 | 40.76 |
| Test 6 | 52.48 | 40.07 |
| Test 7 | 52.48 | 40.92 |
| Test 8 | 52.44 | 41.47 |
| Test 9 | 54.34 | 40.84 |
| Test 10 | 52.63 | 40.40 |
| Mean value | 52.83 | 40.73 |
| Standard deviation | 0.62 | 0.37 |
| Repeatability | ±1.85 | ±1.11 |

Table 3 shows an inspecting result of the amount of radial runout of the second sample, in which a mean value of the amount of radial runout was 41.74 μm, and the repeatability thereof was ±0.89 μm. Table 4 shows an inspecting result of the amount of axial runout of the second sample, in which a mean value of the amount of axial runout of the upper boundary was 108.84 μm, and the repeatability thereof was ±1.95 μm; and a mean value of the amount of axial runout of the lower boundary was 133.27 μm, and the repeatability thereof was ±1.77 μm. It can be observed that the inspection repeatability of the system was within the range of ±2 μm.

TABLE 3

| | The amount of radial runout (μm) |
|---|---|
| Test 1 | 41.24 |
| Test 2 | 41.88 |
| Test 3 | 42.03 |
| Test 4 | 41.92 |
| Test 5 | 41.61 |
| Test 6 | 41.86 |
| Test 7 | 41.57 |
| Test 8 | 41.34 |
| Test 9 | 42.17 |
| Test 10 | 41.81 |
| Mean value | 41.74 |
| Standard deviation | 0.30 |
| Repeatability | ±0.89 |

TABLE 4

| | The amount of axial runout of the upper boundary (μm) | The amount of axial runout of the lower boundary (μm) |
|---|---|---|
| Test 1 | 108.01 | 132.77 |
| Test 2 | 108.72 | 133.65 |

TABLE 4-continued

| | The amount of axial runout of the upper boundary (μm) | The amount of axial runout of the lower boundary (μm) |
|---|---|---|
| Test 3 | 108.89 | 133.09 |
| Test 4 | 109.24 | 133.30 |
| Test 5 | 108.86 | 133.78 |
| Test 6 | 107.94 | 132.34 |
| Test 7 | 109.08 | 133.11 |
| Test 8 | 108.80 | 133.79 |
| Test 9 | 110.25 | 134.22 |
| Test 10 | 108.57 | 132.64 |
| Mean value | 108.84 | 133.27 |
| Standard deviation | 0.65 | 0.59 |
| Repeatability | ±1.95 | ±1.77 |

In view of the above, the automated optical inspection system of the runout tolerance of circular saw blades according to the present invention uses a non-contact optical inspection manner to eliminate the disadvantages caused in inspection by a contact dial indicator in the prior art. In addition, automatic inspection can be performed by using the automatically controlled stepping motor, and thus the inspection efficiency is greatly improved. Furthermore, the automated optical inspection system of the runout tolerance of circular saw blades can be used to inspect circular saw blades of different sizes, thus having high flexibility in use.

What is claimed is:

1. An automated optical inspection system for the runout tolerance of circular saw blades, for inspecting a runout amount of a circular saw blade, wherein the runout amount includes a radial runout and an axial runout, the circular saw blade includes multiple teeth, each tooth has a side and a back, and the automated optical inspection system for the runout tolerance comprises:

a base;

a rotating device, disposed on the base and used to rotate the circular saw blade;

a linear adjustment mechanism, disposed on the base and translated relative to the base along an axial direction;

a first optical inspection module, disposed on the linear adjustment mechanism, and used to capture the side of each tooth, to obtain a side image;

a second optical inspection module, for capturing the back of each tooth, to obtain a back image; and a computing device, for activating the rotating device to rotate the circular saw blade, activating the first optical inspection module and the second optical inspection module to capture the side image and the back image of each tooth upon rotation of the circular saw blade, and performing a radial-position-calculating procedure according to the side images and an axial-position-calculating procedure according to the back images, wherein the radial-position-calculating procedure comprises:

a preliminary positioning sub-procedure, for controlling the rotating device by the computing device, to rotate the circular saw blade, and gradually capturing the side image by the first optical inspection module, until the tooth is determined to be located at a central region of the side image;

an edge detection sub-procedure, for detecting multiple pixels in each column of the side image by the computing device, to obtain multiple edge points, then obtain a fitted curve according to coordinates of the edge points, and obtain a fitted end point according to a highest point on the fitted curve, wherein the fitted end point is a top position of the tooth in the side image; and a precise positioning sub-procedure, for computing a fine tuning angle $\theta \approx \sin^{-1}(\Delta x/r)$ by the computing device according to a normal distance $\Delta x$ from the fitted end point to a reference axis and a default radius r of the circular saw blade, and controlling the rotating device by the computing device according to the fine tuning angle $\theta$, to adjust an angular position of the circular saw blade, wherein the computing device repeatedly performs the edge detection sub-procedure and the precise positioning sub-procedure, until the normal distance $\Delta x$ from the fitted end point to the reference axis in the side image is lower than a threshold value, so as to obtain a corresponding radial position of the fitted end point of the tooth in the side image; and the computing device performs the radial-position-calculating procedure on each tooth, to obtain the corresponding radial position of the fitted end point of each tooth, and then the computing device obtains the amount of radial runout according to the radial positions; the computing device performs the axial-position-calculating procedure, by performing an edge detection sub-procedure on multiple pixels in each column of the back image, to obtain multiple edge points, and further obtain an upper boundary fitted curve and a lower boundary fitted curve according to coordinates of the edge points, and then the computing device obtains an upper boundary fitted end point according to a highest point on the upper boundary fitted curve, and a lower boundary fitted end point according to a lowest point on the lower boundary fitted curve, wherein the upper boundary fitted end point and the lower boundary fitted end point are respectively an upper boundary axial position and a lower boundary axial position of the tooth in the back image; and the computing device performs the axial-position-calculating procedure on each tooth, so as to obtain the upper boundary axial position and the lower boundary axial position of each tooth, and then the computing device obtains the amount of axial runout according to the upper boundary axial positions and the lower boundary axial positions.

2. The automated optical inspection system for the runout tolerance of circular saw blades according to claim 1, wherein the linear adjustment mechanism comprises a main structural body, a lead screw, a sliding platform, and a handwheel, wherein the main structural body is connected to the base, the sliding platform is located above the main structural body, the lead screw and the sliding platform are connected with each other through a helical kinematic pair, the handwheel rotated manually to drive the lead screw to cause translation motion of the sliding platform relative to the main structural body, and the first optical inspection module is disposed on the sliding platform.

3. The automated optical inspection system for the runout tolerance of circular saw blades according to claim 1, wherein the rotating device comprises a motion mechanism and a main shaft, and the motion mechanism comprises a stepping motor, a gear reducer, and a coupling, a rotary shaft of the stepping motor is connected to an input end of the gear reducer, an output end of the gear reducer is connected to the coupling, one end of the main shaft is connected to the coupling, the computing device controls the stepping motor through a motion control module, the stepping motor drives the main shaft to rotate, and the other end of the main shaft has a circular saw blade supporting portion, for supporting and fixing the circular saw blade.

4. The automated optical inspection system for the runout tolerance of circular saw blades according to claim 3, further comprising a calibration gauge, wherein the calibration gauge comprises a precision circular disk and a calibration ruler, the precision circular disk is disposed on the circular saw blade supporting portion on the main shaft of the rotating device, and the first optical inspection module obtains the reference axis according to an image of a ruler edge of the calibration ruler.

5. The automated optical inspection system for the runout tolerance of circular saw blades according to claim 1, wherein the first optical inspection module comprises a first image sensing unit, a first lens, and a first backlight illumination device, the first image sensing unit is electrically connected to the computing device, an optical axis of the first lens is parallel to a rotation axis of the circular saw blade, and the first backlight illumination device is correspondingly disposed in a capture range of the first lens.

6. The automated optical inspection system for the runout tolerance of circular saw blades according to claim 1, wherein the second optical inspection module comprises a second image sensing unit, a second lens, and a second backlight illumination device, the second image sensing unit and the second lens are disposed on the linear adjustment mechanism, the second backlight illumination device is disposed on the rotating device, the second image sensing unit is electrically connected to the computing device, an optical axis of the second lens is perpendicular to a rotation axis of the circular saw blade, and the second backlight illumination device is correspondingly disposed in a capture range of the second lens.

7. The automated optical inspection system for the runout tolerance of circular saw blades according to claim 1, wherein the computing device performs the axial-position-calculating procedure after the precise positioning sub-procedure of the radial-position-calculating procedure is completed.

* * * * *